Patented Feb. 28, 1950

2,498,792

UNITED STATES PATENT OFFICE 2,498,792

POLYVINYL RESIN EMULSIONS

Emile Clément Cottet and René Louis Fernand Chasal, Lyon, France, assignors to Societe des Usines Chimiques Rhone-Poulenc, Paris, France, a French company No Drawing. Application January 23, 1946, Serial No. 643,003. In France July 21, 1941

Section 1, Public Law 690, August 8, 1946
Patent expires July 21, 1961

2 Claims. (Cl. 260—8)

This invention is for improvements in or relating to emulsions of polyvinyl resins.

The polymerisation of monomeric vinyl compounds is frequently effected within an aqueous liquid so as to obtain the polyvinyl resin in the form of an emulsion which can be used direct for the purposes of, for example, impregnation or coating.

The majority of such polymerisation processes comprise the addition to the water constituting the polymerisation medium of a protective colloid, for example gelatine. Now, although commercial gelatine can be used for the purpose provided it is present in sufficient concentration, nevertheless its use involves a serious drawback: with the gelatine concentrations necessary for satisfactory polymerisation procedure the emulsions finally obtained are fluid only at relatively high temperatures, for instance 40° C. and higher, which is a serious disadvantage in their practical application.

According to the present invention, it has now been found that polyvinyl resin emulsions which do not suffer from the disadvantage mentioned above, that is, emulsions which are fluid at ordinary temperatures, can be obtained provided the polymerisation is effected in the presence, as protective colloids, of polypeptides obtainable by the controlled degradation of animal proteins. According to a preferred feature of the invention, polypeptides obtained by the degradation of gelatine are employed.

Degradation of proteins has long been carried out in connection with the manufacture of liquid glues. Among the numerous known processes, it is preferred, in preparing the polypeptides employed as protective colloids in accordance with this invention, to employ degradation by heat.

The preferred polypeptides can, for example, be obtained by heating 40% aqueous solutions of gelatine to boiling point at ordinary pressure, or at a higher temperature under pressure.

The degradation treatment is carried out for the time necessary for the final emulsion to have the desired characteristics. Thus certain uses may require an emulsion which is more fluid than, although with the same polyvinyl resin content as, another emulsion. For such an emulsion, a more highly degraded product will be used.

The process of the invention makes it possible by the utilisation of very varied degradation products to prepare emulsions of polyvinyl resins having all desired characteristics of fluidity and of concentration of solids. By way of example, with a gelatine degraded to the extent that a 20% aqueous solution has a viscosity of 6 centipoises at 35° C., it is possible to prepare emulsions of polyvinyl acetate containing up to 65% of dry resin and having at 25° C. sufficient fluidity for the majority of current uses, whereas such high concentrations cannot be obtained with other known colloids. It will be understood that the figures of 6 centipoises is only indicated by way of example; according to circumstances, it may be found desirable to use a gelatine having under the same conditions a smaller viscosity, for instance 5 centipoises, or on the other hand a higher one, up to 15 centipoises.

According to a further feature of the invention, it has been found moreover, that by adding to the polymerisation medium (water+polypeptides of degradation) a wetting agent, the fineness of the emulsion is improved to a high degree. Such wetting agents are, for instance, alkaline salts of the sulphonation products of alkylated polynuclear compounds.

The polymerisation is effected in known manner, for example by means of a polymerisation catalyst of the peroxide type. Catalysts which have been proved particularly advantageous for the polymerisation in emulsion in the presence of polypeptides according to the invention are the alkaline persulphates, which give a particularly fluid and stable emulsion, characterised moreover by its absence of coloration.

There will now be described, by way of non-limiting examples, methods of carrying out the invention; parts stated are parts by weight.

*Example I*

A 20% aqueous solution of fish glue is degraded by heating in an autoclave for 5 hours at 135° C. The viscosity of the solution obtained is reduced to 5.65 centipoises measured at 35° C.

There are then agitated together at boiling point 100 parts of this solution, 220 parts of vinyl acetate and 1 part of sodium persulphate. A very fine emulsion of monomeric vinyl acetate is formed, which under the influence of the heating and of the catalyst is converted into an emulsion of polyvinyl acetate. The temperature of the mass rises progressively to 90° C. When this temperature is reached, the vinyl acetate is completely polymerised. The water necessary for maintaining good viscosity is added during the operation. The emulsion obtained has sufficient fluidity at a concentration of 66% for current uses, such, for example, as the coating of fabrics.

*Example II*

Operating as indicated in Example I, but heating a 20% solution of gelatine for only 2 hours in an autoclave at 135° C., the viscosity is brought to 10 centipoises at 35° C.; 220 parts of vinyl acetate are polymerised with intense agitation in the presence of 100 parts of this solution, 0.5 part of dextrine, 0.5 part of saponine and 1 part of 100 volume hydrogen peroxide.

The resulting emulsion with a concentration of 62% can be used as an adhesive in place of glue or latex.

*Example III*

An aqueous solution containing 20% of commercial gelatine and 0.1% of 52% nitric acid is heated to boiling point for one hour. It is cooled, the nitric acid is neutralised, and a solution is obtained of which the viscosity is about 13 centipoises at 35° C. and which remains fluid when cold. In 100 parts of this solution are dissolved 1 part of sodium butoxydiphenylsulphonate and 1.5 part of potassium persulphate, and it is then heated to 70–73° C. Into this mixture, intensively agitated, there are poured slowly 220 parts of vinyl acetate, with concomitant polymerisation, and the temperature is kept between 68 and 70° C. The temperature is then raised rapidly to 90° C. to complete the polymerisation, and the emulsion is cooled. The product is diluted if necessary to obtain a concentration of 60% of solids.

The product has the form of an excellent emulsion very finely dispersed, free of lumps and flowing readily. Such an emulsion is particularly suitable for the manufacture of artificial leather.

We claim:

1. An aqueous emulsion of polyvinyl acetate containing up to 65% of dry resin, a member selected from the class consisting of the alkaline salts of the sulphonation products of alkylated polynuclear compounds and, as protective colloid, a polypeptide obtained by heating to boiling a 40% by weight aqueous solution of gelatine until the product, diluted to a 20% solution, has a viscosity at 35° C. of 6 to 15 centipoises.

2. A support coated with an aqueous emulsion as defined in claim 1.

EMILE CLÉMENT COTTET.
RENÉ LOUIS FERNAND CHAZAL.

REFERENCES CITED

The following references are of record in the file of this patent:

UNITED STATES PATENTS

| Number | Name | Date |
|---|---|---|
| 1,756,943 | Frankenburger | May 6, 1930 |
| 2,380,474 | Stewart | July 31, 1945 |

FOREIGN PATENTS

| Number | Country | Date |
|---|---|---|
| 294,963 | Great Britain | Feb. 3, 1930 |